United States Patent
Katada

(10) Patent No.: US 9,033,022 B2
(45) Date of Patent: May 19, 2015

(54) SUNSHADE DEVICE

(75) Inventor: Naochika Katada, Settsu (JP)

(73) Assignee: ASHIMORI INDUSTRY CO., LTD., Osaka-shi (JP)

( * ) Notice: Subject to any disclaimer, the term of this patent is extended or adjusted under 35 U.S.C. 154(b) by 141 days.

(21) Appl. No.: 13/822,418

(22) PCT Filed: Sep. 13, 2011

(86) PCT No.: PCT/JP2011/070780
§ 371 (c)(1),
(2), (4) Date: Mar. 12, 2013

(87) PCT Pub. No.: WO2012/039314
PCT Pub. Date: Mar. 29, 2012

(65) Prior Publication Data
US 2013/0168034 A1    Jul. 4, 2013

(30) Foreign Application Priority Data

Sep. 24, 2010 (JP) .................. 2010-213620

(51) Int. Cl.
*B60J 3/02* (2006.01)
*B60J 1/20* (2006.01)

(52) U.S. Cl.
CPC .............. *B60J 1/2013* (2013.01); *B60J 1/2038* (2013.01); *B60J 1/2044* (2013.01); *B60J 1/208* (2013.01)

(58) Field of Classification Search
CPC ........ B60J 1/2044; B60J 1/205; B60J 1/2052; B60J 1/2063
USPC ..................... 160/370.22, 265; 296/97.8, 143
See application file for complete search history.

(56) References Cited

U.S. PATENT DOCUMENTS 5,201,810 A * 4/1993 Ojima et al. .................. 160/265
5,404,926 A * 4/1995 Ojima et al. .................. 160/280

(Continued)

FOREIGN PATENT DOCUMENTS

CN   1884781 A   12/2006
CN   1958322 A   5/2007

(Continued)

OTHER PUBLICATIONS

International Search Report Issued Dec. 27, 2011 in PCT/JP11/70780 Filed Sep. 13, 2011.

(Continued)

*Primary Examiner* — Katherine Mitchell
*Assistant Examiner* — Abe Massad
(74) *Attorney, Agent, or Firm* — Oblon, McClelland, Maier & Neustadt, L.L.P.

(57) ABSTRACT

A sunshade device includes a pair of rails disposed so as to have a gradually decreasing spacing therebetween, a windup device disposed between proximal ends of the pair of rails, a shade configured to be drawn from and housed in the windup device, a stay attached to a short side edge of the shade, a pair of shafts respectively inserted into the stay so as to move along a longitudinal direction thereof at both ends of the stay, and a pair of runners respectively provided so as to move along the pair of rails and coupled to the pair of shafts. Provided at least on one end side of the stay is a rotation mechanism causing the stay to change its position upon reception of a force by which the shafts move along the longitudinal direction of the stay as the pair of runners move along the pair of rails.

6 Claims, 8 Drawing Sheets

(56) References Cited

U.S. PATENT DOCUMENTS

| | | | |
|---|---|---|---|
| 5,560,668 A * | 10/1996 | Li | 296/97.8 |
| 5,601,133 A * | 2/1997 | Krupke et al. | 160/265 |
| 6,086,133 A | 7/2000 | Alonso | |
| 7,316,443 B2 * | 1/2008 | Schlecht | 296/97.8 |
| 7,396,067 B2 * | 7/2008 | Thumm et al. | 296/143 |
| 8,602,082 B2 * | 12/2013 | Walter | 160/370.22 |
| 2001/0017194 A1 | 8/2001 | Schlecht et al. | |
| 2006/0290162 A1 | 12/2006 | Schlecht et al. | |
| 2007/0095489 A1 | 5/2007 | Thumm et al. | |
| 2009/0044454 A1 * | 2/2009 | Meichtry | 49/197 |
| 2012/0111512 A1 | 5/2012 | Katada | |
| 2012/0186758 A1 | 7/2012 | Katada | |
| 2012/0193935 A1 * | 8/2012 | Lin | 296/97.8 |
| 2013/0008619 A1 | 1/2013 | Katada | |

FOREIGN PATENT DOCUMENTS

| | | |
|---|---|---|
| EP | 0 989 006 A1 | 3/2000 |
| EP | 1 418 073 A1 | 5/2004 |
| JP | 2007 1569 | 1/2007 |
| JP | 2007 126143 | 5/2007 |
| JP | 2010 215137 | 9/2010 |
| JP | 2010-215137 A | 9/2010 |
| JP | 2011-11688 A | 1/2011 |

OTHER PUBLICATIONS

Office Action issued on May 27, 2014 in the corresponding Japanese Patent Application No. 2010-213620 (with partial English Translation).

International Preliminary Report on Patentability issued Apr. 4, 2013 in PCT/JP2011/070780 filed Sep. 13, 2011.

International Preliminary Report on Patentability issued Apr. 25, 2013 in PCT/JP2011/070780 filed Sep. 13, 2011.

Witten Opinion issued Dec. 27, 2011 in PCT/JP2011/070780 filed Sep. 13, 2011 with English language translation.

Office Action and Search Report issued on Nov. 4, 2014 in the corresponding Chinese Patent Application No. 201180045869.2 (with partial English Translation).

* cited by examiner

F I G. 1 7
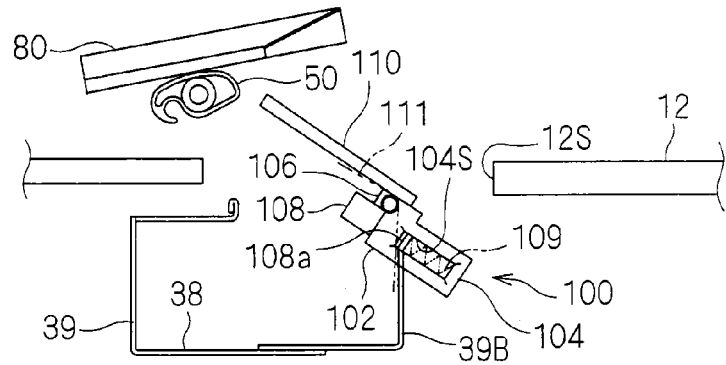
F I G. 1 8
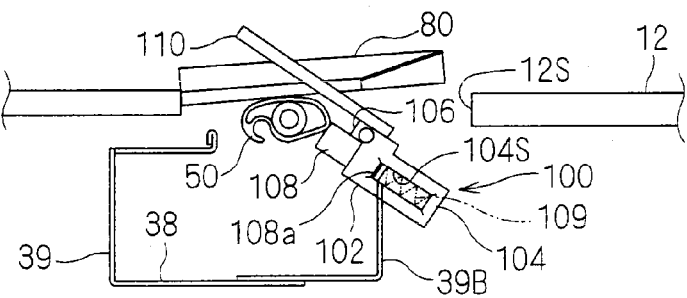
F I G. 1 9
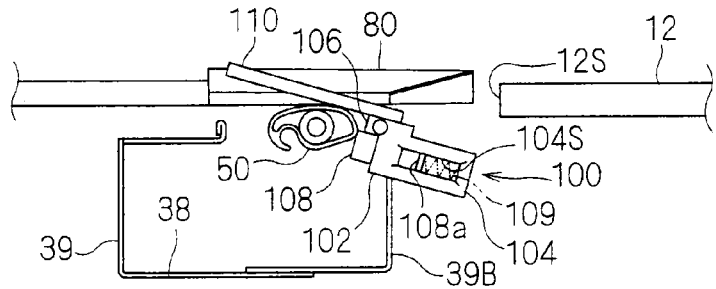
F I G. 2 0
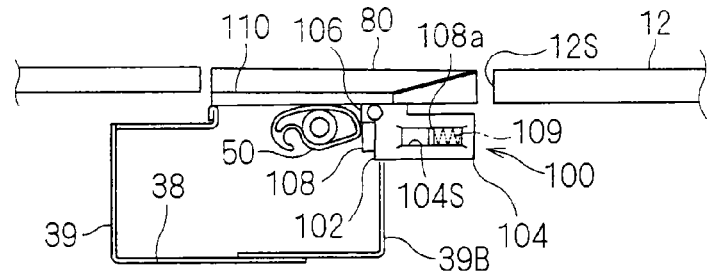

SUNSHADE DEVICE

TECHNICAL FIELD

The present invention relates to a sunshade device used for, for example, a rear window of a vehicle.

BACKGROUND ART

Patent Document 1 discloses a rear-window roller blind for motor vehicles that is configured to close a gap between a straight pull rod assembly and a curved window edge. According to Patent Document 1, guide rails follow the side contours of a rear window, initially beginning with a vertical section that extends perpendicularly to a plane of a rear shelf, to thereby extend with increasingly horizontal components. Slides have an elongated shape and are configured to move through the guide rails with its longitudinal axis coinciding with the longitudinal axis of the guide rail. Then, the slides and the pull rod assembly fixed to the slide turn during the motion along the guide rails, and become close to the window top edge. Accordingly, a contoured plate provided to the pull rod assembly becomes increasingly upright, whereby the gap between the straight pull rod assembly and the window edge is closed.

PRIOR ART DOCUMENT

Patent Document

Japanese Patent Application Laid-Open No. 2007-126143

SUMMARY OF THE INVENTION

Problem to be Solved by the Invention

According to Patent Document 1, unfortunately, the position of the contoured plate is controlled in accordance with a curved shape of the rail. This may lead to a problem that, for example, the gap cannot be closed well by the contour guide or the contour plate interferes with the other member during the course of position change.

Therefore, the present invention has an object to enable a stay attached to an edge of a shade to change a position thereof along with the operation of drawing/housing the shade without depending on the curved shape of the rail.

Means to Solve the Problem

In order to solve the above-mentioned problem, a first aspect relates to a sunshade device configured to shield a window, which includes: a pair of rails disposed so as to have a spacing therebetween that gradually decreases at least at a part from a proximal end toward a distal end thereof; a windup device disposed between proximal ends of the pair of rails and including a windup shaft supported so as to rotate about an axis; a shade including a short side edge and a long side edge opposed to each other and configured to be drawn from and housed in the windup device, the long side edge being attached to the windup shaft; a stay attached to the short side edge of the shade; a pair of shafts respectively inserted into both ends of the stay so as to move along a longitudinal direction thereof; a pair of runners respectively provided so as to move along the pair of rails and coupled to the pair of shafts; and a rotation mechanism provided at least on one end side of the stay and causing the stay to change a position thereof upon reception of a force by which the shafts move along the longitudinal direction of the stay as the pair of runners move along the pair of rails.

In a second aspect, in the sunshade device according to the first aspect, the pair of rails are configured to have the spacing therebetween that has a gradually decreasing dimension from the proximal end toward the distal end so as to be disposed along both sides of a trapezoidal window.

In a third aspect, in the sunshade device according to the first or second aspect, the stay is provided with a cover body covering gaps between window peripheral members located on a distal end side of the pair of rails and the stay in a state in which the shade is drawn, and the rotation mechanism causes the stay to change the position thereof such that the cover body covers the gaps between the window peripheral members and the stay in the state in which the shade is drawn.

In a fourth aspect, in the sunshade device according to any one of the first to third aspects, the shade is configured to be drawn and housed through a slit formed in a mounting panel member located near a window, and the rotation mechanism causes the stay to change the position thereof such that at least one of the stay and the cover body is disposed to be flush with the surface of the mounting panel member.

In a fifth aspect, in the sunshade device according to any one of the first to fourth aspects, the rotation mechanism includes a protrusion provided to any one of the inner peripheral portion of the stay and the outer peripheral portion of the shaft and a guide recess provided to the other of an inner peripheral portion of the stay and an outer peripheral portion of the shaft, and upon the shaft moving within the stay along the longitudinal direction thereof due to a change of the spacing between the pair of rails, causes the stay to change the position thereof through sliding contact of the protrusion with the guide recess.

In a sixth aspect, in the sunshade device according to the fifth aspect, the guide recess includes a spiral groove portion.

In a seventh aspect, in the sunshade device according to any one of the first to sixth aspects, the shade is configured to be drawn and housed through a slit formed in the mounting panel member located near a window, and side covers that openably cover both ends of the slit in the state in which the shade is housed are provided in portions outside of both ends of at least one of the stay and the cover body.

Effects of the Invention

According to the first aspect, the stay is allowed to change the position thereof upon reception of the force by which the spacing between the pair of runners changes as the pair of runners move along the pair of rails. This enables the stay attached to the edge of the shade to change the position thereof along with the operation of drawing/housing the shade without depending on, for example, the curved shape of the rail.

According to the second aspect, the pair of rails can be disposed along both sides of a trapezoidal window, which makes the pair of rails less conspicuous.

According to the third aspect, the cover body covers the gap between the stay and a window peripheral member in the state in which the shade is drawn, which prevents the entrance of light from outside with more reliability.

According to the fourth aspect, at least one of the stay and the cover body is disposed to be flush with the surface of the mounting panel member in the state in which the shade is housed, leading to excellent design.

According to the fifth aspect, the stay can be rotated in accordance with the movement of the shaft and the shape of the guide recess. Therefore, the stay attached to edge of the shade is allowed to change its position more freely.

According to the sixth aspect, the protrusion is guided by the spiral groove portion. This allows the stay to change its position when the shade is drawn as well as housed.

According to the seventh aspect, the slit through which the shade is drawn can be covered more entirely.

BRIEF DESCRIPTION OF DRAWINGS

FIG. 17 is an explanatory view showing the operation in which a side cover is closed as the shade is wound and housed.

FIG. 18 is another explanatory view showing the operation in which the side cover is closed as the shade is wound and housed.

FIG. 19 is still another explanatory view showing the operation in which the side cover is closed as the shade is wound and housed.

FIG. 20 is yet still another explanatory view showing the operation in which the side cover is closed as the shade is wound and housed.

EMBODIMENT FOR CARRYING OUT THE INVENTION

A sunshade device according to an embodiment is described below.

<Overall Configuration of Sunshade Device>

Figure 1:
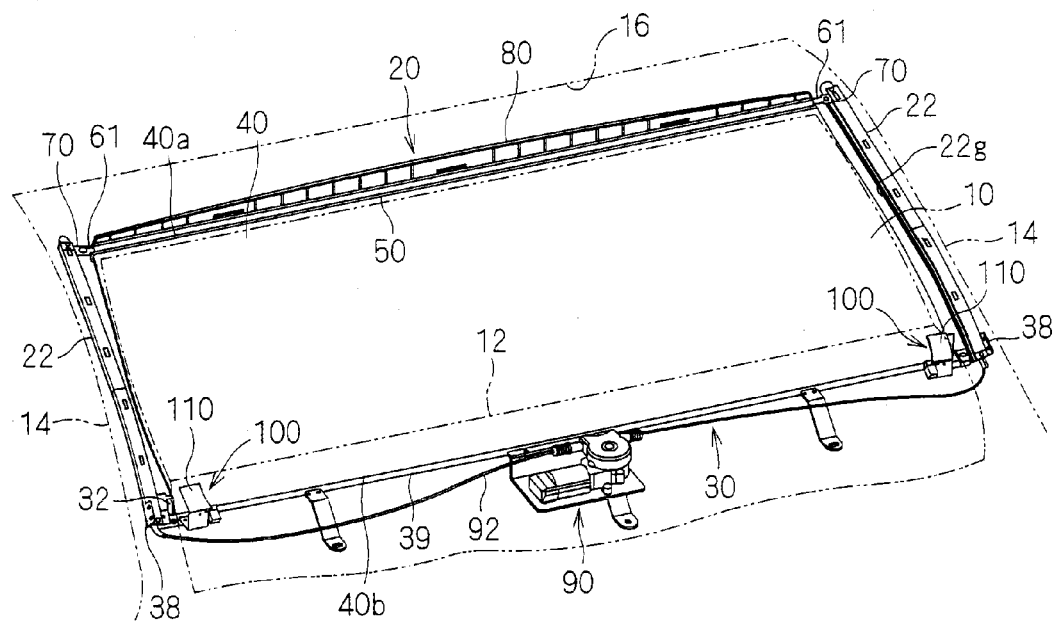
FIG. 1 is a perspective view showing a sunshade device in a state in which a shade is drawn.
Figure 2:
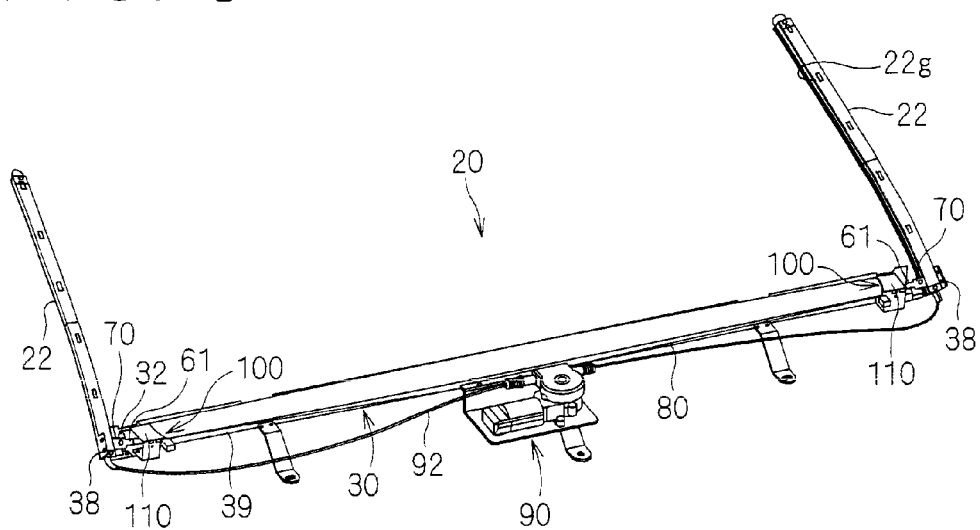
FIG. 2 is a perspective view showing the sunshade device in a state in which the shade is housed.
Figure 3:
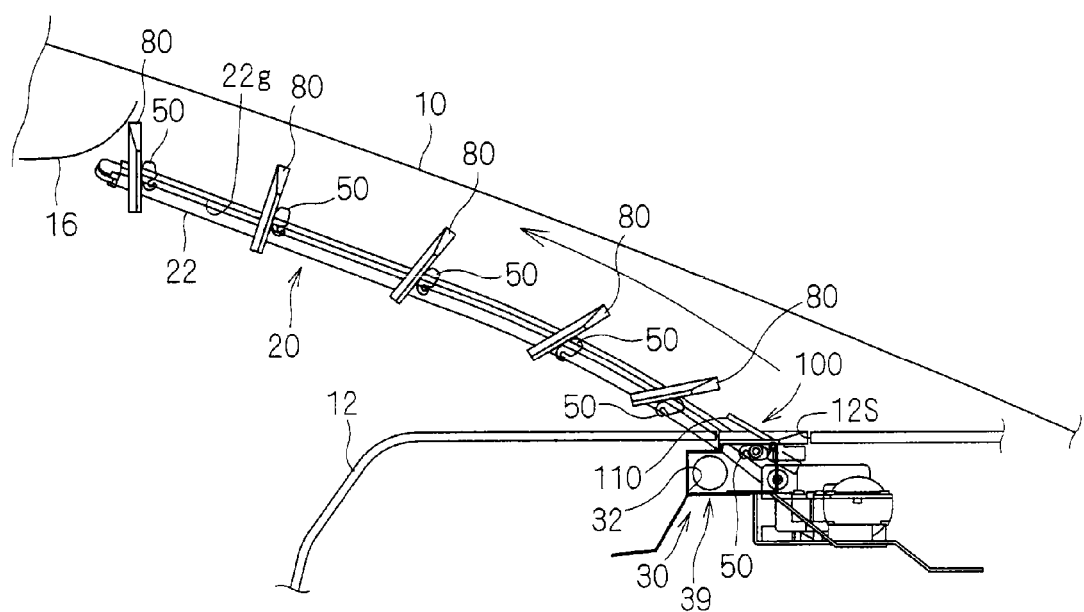
FIG. 3 is an explanatory view showing the state in which the stay changes its position as the shade is drawn.

FIG. 1 is a perspective view showing a sunshade device 20 in a state in which a shade 40 is drawn, FIG. 2 is a perspective view showing the sunshade device 20 in the state in which the shade 40 is housed, and FIG. 3 is an explanatory view showing the state in which a stay 50 changes its position as the shade 40 is drawn.

It is assumed that a rear window 10 of a vehicle is a target to which the sunshade device 20 is applied. That is, the rear window 10 having a trapezoidal shape (more specifically, isosceles trapezoidal shape) is provided in the rear of the vehicle. A mounting panel member 12 (also referred to as package tray) is provided below the rear window 10, frame members 14 (also referred to as pillars) are provided on both sides of the rear window 10, and a ceiling portion 16 is provided above the rear window 10. The sunshade device 20 is mounted inside the mounting panel member 12. The shade 40 is drawn through a slit 12S formed in the mounting panel member 12 so as to shield the rear window 10.

Needless to say, the application target of the sunshade device 20 is not limited to the rear window 10 of a vehicle, and the sunshade device 20 may be applied to various windows such as a roof window and a side window of a vehicle. Also, the rear window 10 is not required to have a trapezoidal shape and may have another shape such as a square shape.

The sunshade device 20 includes a pair of rails 22, a windup device 30, a shade 40, a stay 50, a pair of shafts 61, a pair of runners 70, and a rotation mechanism 60.

The pair of rails 22 are formed as long members formed of metal or the like, and guide grooves 22g capable of guiding the runner 70 are formed therein. The guide grooves 22g are open to be directed toward a portion between the pair of rails 22. The pair of rails 22 may extend linearly or may be curved in a range in which the runner 70 can be movably supported. Here, the pair of rails 22 are formed into a long shape to be curved in a manner of slightly bulging toward the rear window 10 side.

The pair of rails 22 are disposed such that a dimension of a spacing therebetween gradually decreases from a proximal end to a distal end thereof. Here, the proximal ends of the pair of rails are fixed to both ends of the windup device 30, which allows the pair of rails to be disposed to have the spacing therebetween that has a gradually decreasing dimension from the proximal end toward the distal end. Accordingly, the pair of rails 22 are disposed along the both side edges of the rear window having a trapezoidal shape.

The windup device 30 includes a windup shaft 32 supported so as to rotate about an axis. Here, the windup shaft 32 is rotatably supported at both ends thereof by brackets 38 to be disposed between the proximal ends of the pair of rails 22. The brackets 38 are supported by both ends of a long frame member 39 disposed along the windup shaft 32. The windup shaft 32 is biased by a windup biasing mechanism such a coil spring toward one side in a rotational direction thereof. A long side edge 40b (described below) of the shade 40 is attached and fixed to the windup shaft 32, whereby the shade 40 is wound by the windup device 30 and housed therein. When a short side edge 40a (described below) of the shade 40 or the stay 50 is pulled in this state, the windup shaft 32 rotates in the drawing direction against the biasing force of the windup biasing mechanism, so that the shade 40 is drawn toward the outside.

Needless to say, the pair of rails 22 are not required to be fixed to the windup device 30 but may be fixed to the frame member 14 or other member. Alternatively, also in a case where the rear window 10 does not have a trapezoidal shape, it suffices that the pair of rails 22 are disposed to have the spacing therebetween that has a gradually decreasing dimension from the proximal end toward the distal end thereof. Further, it is not required that the pair of rails 22 have the spacing therebetween that has a gradually decreasing dimension from the proximal end toward the distal end thereof entirely in the longitudinal direction thereof. For example, the pair of rails 22 may be provided to have a gradually decreasing spacing therebetween, starting from a part thereof (for example, intermediate portion in the longitudinal direction or the portion in the vicinity of the distal end thereof) from the proximal end toward the distal end by, for example, being partially curved.

The shade 40 is formed into such a shape to shield the target rear window 10. The shade 40 is formed by, for example, cutting and sewing a mesh-like fabric material, resin sheet, or the like in accordance with the shape of the rear window 10. Here, the shade 40 is formed into an isosceles trapezoidal shape corresponding to the shape of the rear window 10. The edge on the upper base side of the shade 40 is the short side edge 40a, while the edge on the lower base side thereof is the long side edge 40b. The short side edge 40a and the long side edge 40b have a positional relationship to be opposed to each other. The long side edge 40b of the shade 40 is fixed to the windup shaft 32, and the short side edge 40a is drawn from the windup shaft 32 toward the outside through the slit 12S. In the state in which the shade 40 is drawn almost entirely, the shade 40 can cover substantially the whole of the rear window 10.

The stay 50 is a long member attached to the short side edge 40a of the shade 40. Here, the stay 50 is a barrel-like member formed of a resin member, aluminum, or the like, and is set to have an approximately identical length dimension to that of the short side edge 40a. Substantially the whole of the short side edge 40a is attached and fixed along the stay 50.

Here, the stay 50 is provided with a cover body 80. In this case, the cover body 80 is formed of a resin or the like into a plate shape, and is fixed to one side surface of the stay 50 by, for example, screwing or concavo-convex fitting structure. More specifically, the cover body 80 is formed into a shape to cover an elongated gap between the stay 50 and the ceiling portion 16 in the state in which the stay 50 has moved uppermost, here, into an elongated-plate-like-shape to have a width gradually increasing from both ends toward the center thereof. Here, the cover body 80 is formed into a plate shape having a width much larger than the width of the elongated gap between the stay 50 and the ceiling portion 16. Then, in the state in which the shade 40 is drawn, the cover body 80 covers the gap while overlapping the stay 50 as well as the ceiling portion 16.

The cover body 80 may be configured separately from the stay 50 and then mounted to the stay 50, or may be configured integrally with the stay 50 by, for example, resin molding. In the latter case, a portion that is formed into a flange shape from one side portion of the stay 50 may serve as a cover body.

Figure 5:
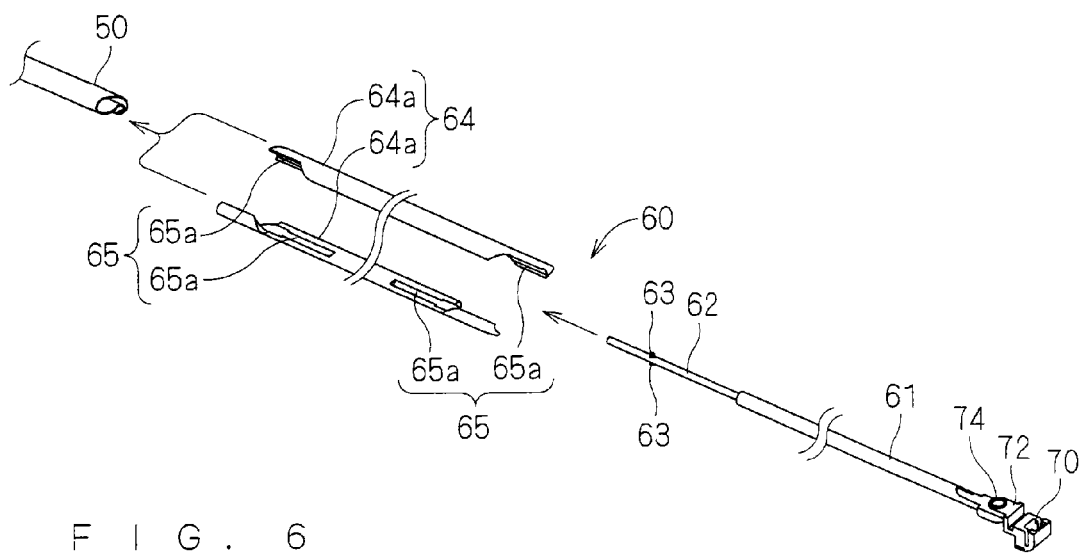
FIG. 5 is an exploded schematic perspective view showing the rotation mechanism.

The pair of runners 70 are respectively configured to move along the pair of rails 22 (see the runner 70 at the end of the shaft 61 in FIG. 5). In a case where the runner 70 moves within the guide groove 22g of the rail 22, an extending portion 72 that is a part of the runner 70 extends outwardly through an inward opening of the guide groove 22g.

The pair of shafts 61 are rod-like members respectively inserted into both ends of into the stay 50 so as to move along the longitudinal direction thereof. The proximal end of the shaft 61 is coupled to the extending portion 72 of the runner 70. Here, the proximal end of the shaft 61 is rotatably coupled to the extending portion 72 of the runner 70 via a shaft part 74. That is, the runner 70 is coupled to the stay 50 via the shaft 61.

The pair of runners 70 respectively move along the pair of rails, whereby the shafts 61 and the stay 50 move as well. Also, the pair of runners 70 respectively move along the pair of rails, whereby the dimension of the spacing between the pair of runners 70 varies in accordance with the dimension of the spacing between the pair of rails 22.

The rotation mechanism 60 is provided on both end sides of the stay 50, and is configured to change the position of the stay 50 upon reception of the force by which the shafts 61 move along the longitudinal direction of the stay 50 as the pair of runners 70 move along the pair of rails 22.

Here, the rotation mechanism 60 changes the position of the stay 50 such that the cover body 80 is disposed to be flush with the surface of the mounting panel member 12 in the state in which the shade 40 is housed. In this case, the rotation mechanism 60 changes the position of the stay 50 such that the cover body 80 changes its position to be approximately parallel to the mounting panel member 12 so as to cover the slit 12S.

The rotation mechanism 60 changes the position of the stay 50 such that the cover body 80 covers the gap between the ceiling portion 16 and the stay 50 in the state in which the shade 40 is drawn. Here, the rotation mechanism 60 changes the position of the stay 50 such that the stay 50 is rotated approximately 90° from the state of the stay 50, in which the shade 40 is housed, to be positioned vertically for enabling the cover body 80 to cover the gap between the ceiling portion 16 and the stay 50.

More specific configuration of the rotation mechanism 60 is described below.

In the present embodiment, a drive mechanism 90 is provided, which serves to drive the shade 40 to be drawn/housed in a motor-driven manner. That is, the drive mechanism 90 is configured to drive the pair of runners 70 to reciprocate between the proximal end and distal end thereof along the pair of rails 22. Examples of the configurations adoptable as the drive mechanism 90 include the configuration in which the runners 70 are attached to part of a wire 92 supported so as to run circularly along the windup device 30 and the pair of rails 22 and the wire 92 is moved circularly in both forward and backward directions by a motor or the like. Preferably, the drive mechanism 90 is connected to a switch (not shown) and is configured so as to drive the shade 40 to be drawn/housed through a switch operation by an operator. The drive mechanism 90 may be configured to move the runners 70 with another configuration. Alternatively, the drive mechanism 90 may be omitted and the shade 40 may be operated manually to be drawn/housed.

<Rotation Mechanism>

Figure 4:
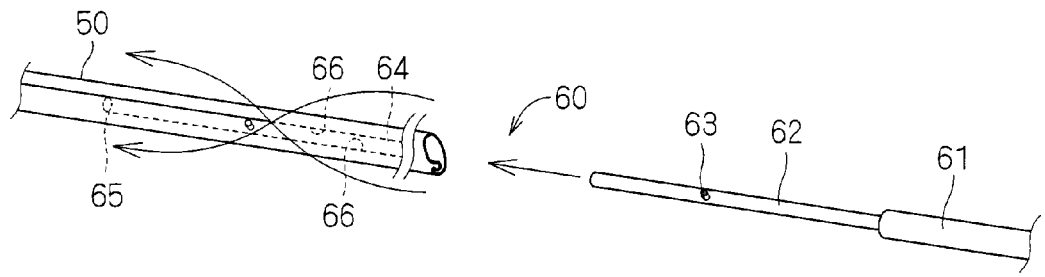
FIG. 4 is a schematic perspective view showing a rotation mechanism.
Figure 6:
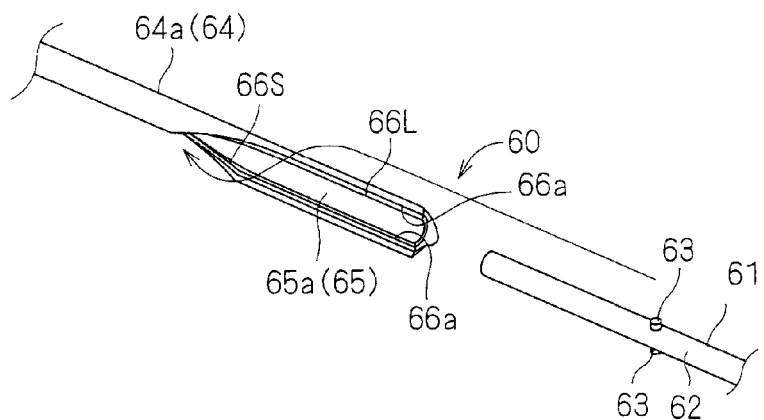
FIG. 6 is a schematic enlarged view of FIG. 5.
Figure 7:
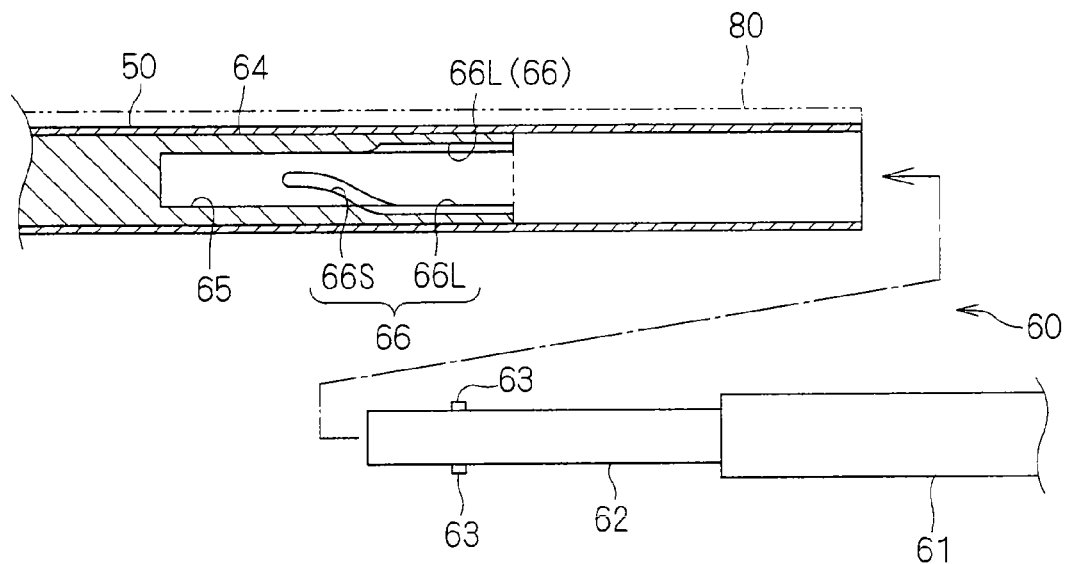
FIG. 7 is an exploded schematic cross-sectional view of the rotation mechanism.
Figure 8:
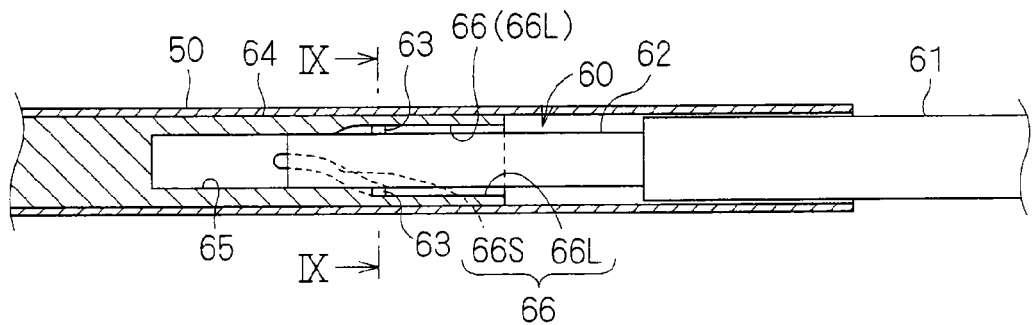
FIG. 8 is an explanatory view showing the relationship between protrusions and guide recesses during the movement of a shaft being inserted.
Figure 9:
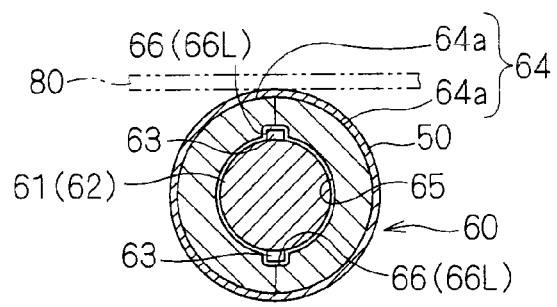
FIG. 9 is a schematic view taken along the Line IX-IX of FIG. 8.
Figure 10:
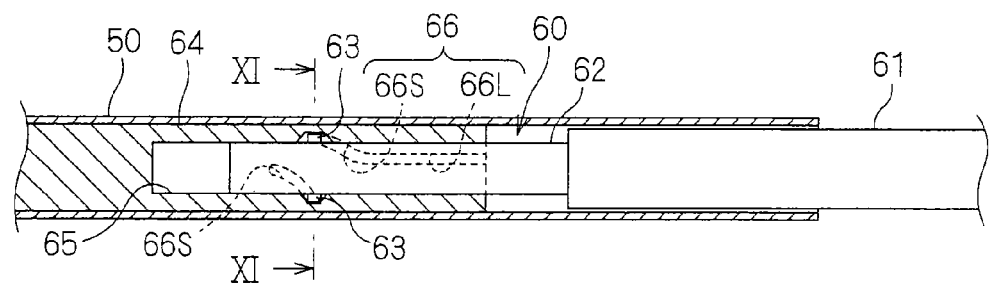
FIG. 10 is another explanatory view showing the relationship between the protrusions and the guide recesses during the movement of the shaft being inserted.
Figure 11:
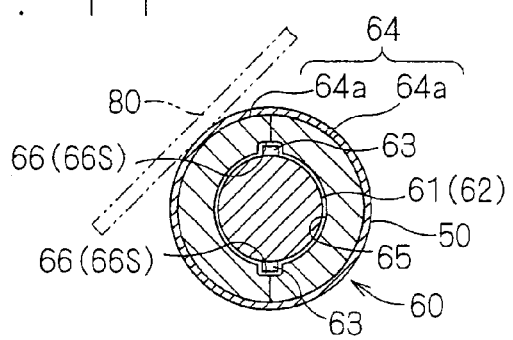
FIG. 11 is a schematic view taken along the line XI-XI of FIG. 10.
Figure 12:
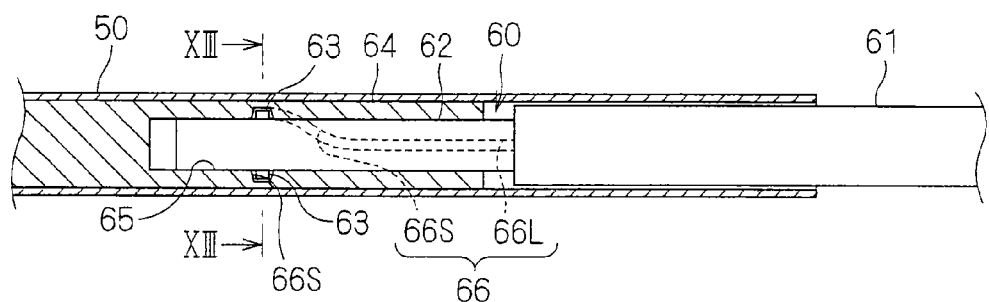
FIG. 12 is still another explanatory view showing the relationship between the protrusions and the guide recesses during the movement of the shaft being inserted.
Figure 13:
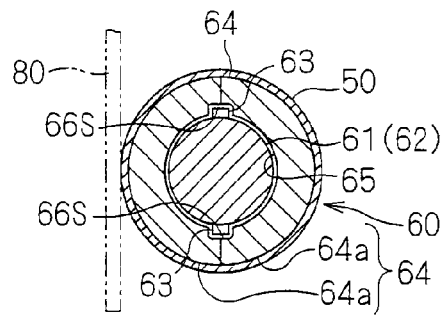
FIG. 13 is a schematic view taken along the line XIII-XIII of FIG. 12.

The rotation mechanism 60 is described more specifically. FIG. 4 is a schematic perspective view showing the rotation mechanism 60, FIG. 5 is an exploded schematic perspective view showing the rotation mechanism 60, and FIG. 6 is a schematic enlarged view of FIG. 5. FIG. 7 is an exploded schematic cross-sectional view of the rotation mechanism 60, FIGS. 8, 10, and 12 are explanatory views showing the relationship between protrusions 63 and guide recesses 66 during the movement of the shaft 61 while being inserted, FIG. 9 is a schematic view taken along the line IX-IX of FIG. 8, FIG. 11 is a schematic view taken along the line XI-XI of FIG. 10, and FIG. 13 is a schematic view taken along the line XIII-XIII of FIG. 12. For the sake of description, the shapes and the like of the stay 50 and the cover body 80 are shown in a simplified manner.

The rotation mechanism 60 includes the protrusions 63 provided on the outer peripheral portion of the shaft 61 and the guide recesses 66 provided on the inner peripheral portion of the stay 50.

More specifically, a pair of protrusions 63 protruding to the sides opposite to each other are provided at a small-diameter portion 62 on the distal end side of the shaft 61. The protrusion 63 may be a portion integrally formed with the body portion of the shaft 61 or may be obtained by mounting another pike-like member to the body portion of the shaft 61. One or three or more protrusions 63 may be provided. Here, the distal end portion of the shaft 61 is formed as the small-diameter portion 62 having a diameter smaller than that on the proximal end side, which is not necessarily required.

A guide member 64 is inserted into the stay 50 to be fixed, whereby the small-diameter portion 62 at the distal end portion of the shaft 61 can be inserted into the guide member 64. The guide recesses 66 are formed in the guide member 64.

More specifically, the guide member 64 is formed of a resin or the like into a rod-like member so as to be inserted into the stay 50. The guide member 64 is fixed so as not to rotate relative to the stay 50 and not to move in the axis direction in the stay 50.

Provided at both ends of the guide member 64 are guide holes 65 into which the small-diameter portion 62 on the distal end side of the shaft 61 can be inserted. The pair of guide recesses 66 are formed on the inner peripheral portion of the guide hole 65. The guide recess 66 is formed into an elongated groove shape to extend from the opening of the guide hole 65 toward some midpoint in the longitudinal direction thereof. The width dimension and depth dimension of the guide recess 66 are larger (slightly larger) than the width dimension and protruding dimension of the protrusion 63, so that the protrusion 63 can pass through the guide recess 66 and move. The guide recess 66 includes a linear groove portion 66L extending along the longitudinal direction of the stay 50 at the opening-side portion of the guide hole 65, and a spiral groove portion 66S spirally extending along the inner periphery of the guide hole 65 at the intermediate portion in the longitudinal direction of the guide hole 65. Here, the spiral groove portion 66S is formed in spiral for a quarter turn, so that the stay 50 is rotated for a quarter turn, that is, 90°.

Here, the configuration is made such that the guide members 64 are inserted to be located at intermediate locations in the longitudinal direction of the stay 50 and that the pair of shafts 61 inserted from both ends of the stay 50 are inserted into the guide holes 65 at both ends of the guide members 64. Therefore, the guide holes 65 are formed at both ends of the guide member 64, which is not necessarily required. For example, guide members each having a guide hole may be provided separately at one end and the other end of the stay 50. Alternatively, guide members each having a guide hole may be provided to only one end portion of the stay 50 (that is, the rotation mechanism 60 may be incorporated only on one end side of the stay 50).

Here, the guide member 64 is composed through combination of two divided guide members 64a. Each divided guide member 64a is formed by dividing a rod-like member vertically and twisting the portion corresponding to the spiral groove portion 66S 90°. Divided guide holes 65a obtained by dividing the guide hole 65 into two are formed at both ends of each divided guide member 64a. Further, divided guide recesses 66a obtained by dividing the guide recess 66 into two are formed at side end portions of the divided guide hole 65a of each divided guide member 64a. The two divided guide recesses 66a are combined to form the guide member 64. The divided guide member 64a as described above can also be formed by molding, leading to a benefit that the guide member 64 including the spiral groove portion 66S can be manufactured relatively simply. Needless to say, the method of manufacturing the guide member 64 is not limited to the above-mentioned example, which may be, for example, the method of cutting away the spiral groove portion 66S in the later process to be processed and formed.

In the state in which the shade 40 is housed and the pair of runners 70 are located on the proximal end side of the pair of rails 22, that is, in the state in which the dimension of the spacing between the pair of runners 70 is the largest and the shafts 61 are drawn most from the stay 50, the protrusions 63 are located within the linear groove portions 66L and the cover body 80 is approximately horizontal (see FIGS. 8 and 9).

The shade 40 is drawn from this state and the pair of runners 70 move along the pair of rails 22 toward the distal end side thereof, so that the dimension of the spacing between the pair of runners 70 gradually decreases and the shafts 61 are pushed gradually toward the stay 50. Then, the protrusions 63 of the shafts 61 move deeply into the spiral groove portion 66S while being in sliding contact with the spiral groove portion 66S, whereby the guide member 64 and the stay 50 are rotated and caused to change the positions thereof.

Finally, the shade 40 is drawn entirely and the pair of runners 70 extend along the pair of rails 22 and reach the distal end side thereof, whereby the dimension of the spacing between the pair of runners 70 becomes the smallest. This results in the state in which the shafts 61 are pushed most toward the stay 50. In this state, the protrusions 63 are located to the deepest extent in the spiral groove portions 66S, and the stay 50 is rotated until the position of the cover body 80 is changed to be approximately vertical.

In a case where the shade 40 is wound and housed, on the contrary, the protrusions 63 move from the spiral groove portions 66S toward the linear groove portions 66L in the guide recess 66. Accordingly, the position of the cover body 80 is changed to be approximately horizontal in the state in which the shade 40 is wound entirely.

The range of the angle at which the stay 50 is rotated can be set by the central angle of a circular arc drawn around the inner peripheral portion of the stay 50 by the spiral groove portion 66S. The relationship between the location of the runner 70 in the rail 22 and the timing of position change and speed of position change of the stay 50 can be adjusted by separately forming the linear groove portion and the spiral groove portion in the guide recess as necessary or by forming the spiral groove portion in a complex spiral form in which spiral pitches are changed as required.

Accordingly, the guide recess 66 is appropriately set to have a groove shape in accordance with the position required for the stay 50 and the cover body 80 or in view of the circumstances that the guide recess 66 does not interfere with a peripheral member during a position change.

Here, the protrusions 63 are formed in the upper and lower end portions of the shaft 61. The outer side portions of the pair of guide recesses 66 are formed at the locations of 0° and 180° about the guide member 64 from the location at which the cover body 80 is attached, and the deep side portions of the pair of guide recesses 66 are formed at the locations of 90° and 270° about the guide member 64 from the location at which the cover body 80 is attached. The pair of guide recesses 66 spiral between the above-mentioned portions.

Therefore, as described above, in the state in which the shade 40 is housed, the rotation mechanism 60 causes the cover body 80 to cover the slit 12S in the state in which the cover body 80 changes its position to be approximately parallel to the mounting panel member 12 and is disposed to be flush with the surface of the mounting panel member 12 (see FIGS. 2, 3, 8, and 9).

Then, the stay 50 and the cover body 80 gradually change positions thereof so as to be vertically positioned as the pair of runners 70 move toward the distal end side along the pair of rails 22 (see FIGS. 3, 10, and 11).

Finally, the pair of runners 70 extend along the pair of rails 22 to reach the distal end, so that the cover body 80 rotates approximately 90° to be vertically positioned, to thereby cover the gap between the ceiling portion 16 and the stay 50 (see FIGS. 1, 3, 12, and 13).

Configurations in which the guide recesses 66 are provided in the inner peripheral portion of the stay 50 include the configuration in which guide recesses are provided in the stay 50 itself in addition to the configuration in which the guide recesses 66 are provided in the guide member 64 provided in the stay 50. Alternatively, the portion of the stay 50, in which the guide recesses 66 are provided, and the other intermediate portion thereof may be coupled to serve as the stay.

Still alternatively, protrusions may be provided in the inner peripheral portion of the stay 50 and guide recesses capable of guiding the protrusions toward the shaft 61 side may be provided.

According to the sunshade device 20 including the above-mentioned rotation mechanism 60, the position of the stay 50 is changed upon reception of the force by which the pair of shafts 61 move along the longitudinal direction of the stay 50 as the pair of runners 70 move along the pair of rails 22. This enables to allow the stay 50 attached to the edge of the shade 40 to change its position along with the operation of drawing/housing the shade 40.

The pair of rails 22 disposed so as to have a spacing therebetween that has a gradually decreasing dimension from the proximal end toward the distal end can be disposed along the frame members 14 on both sides of the trapezoidal rear window 10, which makes the pair of rails 22 less conspicuous. From another viewpoint, if the pair of rails 22 are disposed along the frame members 14 on both sides of the trapezoidal rear window 10, the pair of rails 22 can be disposed so as to have a spacing therebetween that has a gradually decreasing dimension from the proximal end toward the distal end, which allows the stay 50 to change its position.

The cover body 80 covers the gap between the stay 50 and the ceiling portion 16 in the state in which the shade 40 is drawn, which enables to prevent the entrance of light from outside with more reliability.

The cover body 80 is disposed in the slit 12S and is disposed to be flush with the surface of the mounting panel member 12 in the state in which the shade 40 is housed, leading to excellent design.

The configuration may be made such that the cover body 80 is omitted and the stay 50 is merely caused to change its position.

Here, the slit 12S is formed in the size and shape approximately identical to those of the cover body 80, and the cover body 80 is disposed in the slit 12S, which is not necessarily required. The configuration may be made such that the slit 12S having a size enough to allow the shade 40 and the stay 50 to be inserted thereinto is formed in the mounting panel member 12, a recess capable of housing the cover body 80 is formed around the outer periphery of the slit 12S of the mounting panel member 12, and the cover body 80 is housed in the recess, whereby the cover body 80 and the mounting panel member 12 are disposed to be flush with each other. Alternatively, in a case where the cover body and the stay are provided to be adjacent to each other, the cover body and the stay may be disposed to be flush with the surface of the mounting panel member. Still alternatively, in the configuration in which the cover body is omitted, the stay may be disposed to be flush with the surface of the mounting panel member.

The cover body 80 covers the slit 12S, which also leads to excellent design. Further, the slit 12S is covered, which keeps out dust, foreign matters, and the like.

The rotation mechanism 60 is configured so as to allow a position change of the stay 50 through sliding contact of the protrusions 63 on the shaft 61 side with the guide recesses 66 on the stay 50 side upon movements of the shafts 61. Accordingly, if the shape of the guide recess 66 is changed as required, the stay 50 attached to the edge of the shade 40 is allowed to change its position freely.

The guide recess is not necessary required to have a groove shape. For example, the configuration may be made such that a guide wall portion capable of being in sliding contact with the protrusion 63 only from one rotational direction of the stay 50 is formed (that is, the portion corresponding only to a side wall portion on one side of the guide recess 66 is formed) as the guide recess, and the protrusion 63 and the guide wall portion are in sliding contact with each other as the shaft 61 moves, whereby the stay 50 is rotated in the other rotational direction.

Preferably, in this case, the stay 50 is rotatively biased by a biasing mechanism such a coil spring toward the direction in which the protrusion 63 and the guide wall portion come into contact with each other. This enables the stay 50 to rotate also in the other rotational direction by the biasing force of the biasing mechanism as the shaft 61 moves.

Needless to say, if the spiral groove portion 66S is formed as the guide recess 66, the stay 50 is allowed to change its position with a relatively simple configuration when the shade 40 is drawn as well as housed.

It suffices that the shape of the guide recess 66 is set as required in accordance with the manner in which the positions of the stay 50 and the cover body 80 are changed. For example, the stay 50 and the cover body 80 may gradually change the positions thereof in the entire range in which the runners 70 move through the rails 22 or may abruptly change the positions thereof at an early stage or late stage during the movement of the runner 70. In a case where the stay 50 or the cover body 80 might interfere with a peripheral portion of a vehicle, the stay 50 or the cover body 80 may be allowed to change its position while avoiding the portion of interference. For example, the shape as described above can be set by setting of a central angle of an arc drawn about the inner peripheral portion of the stay 50 by the spiral groove portion 66S, by setting of separate formation of the linear groove portion and the spiral groove portion, or by setting of a complex spiral form that constitutes the spiral groove portion.

<Side Cover>

The sunshade device 20 is provided with a pair of side covers 100 that openably cover both ends of the slit 12S outside the ends of the cover body 80 in the state in which the shade 40 is housed.

Figure 14:
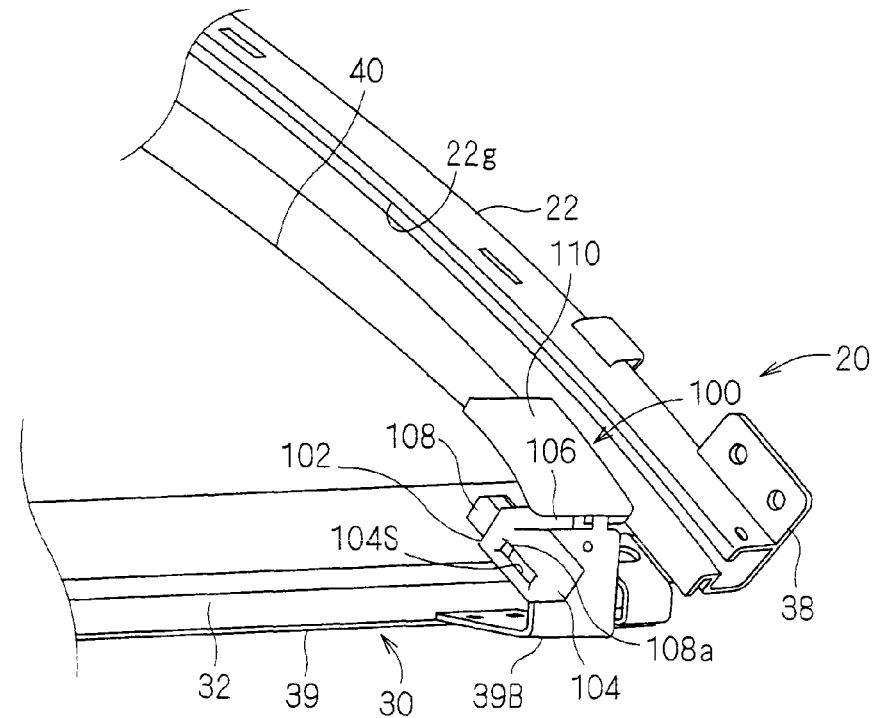
FIG. 14 is a perspective view showing a side cover portion.
Figure 15:
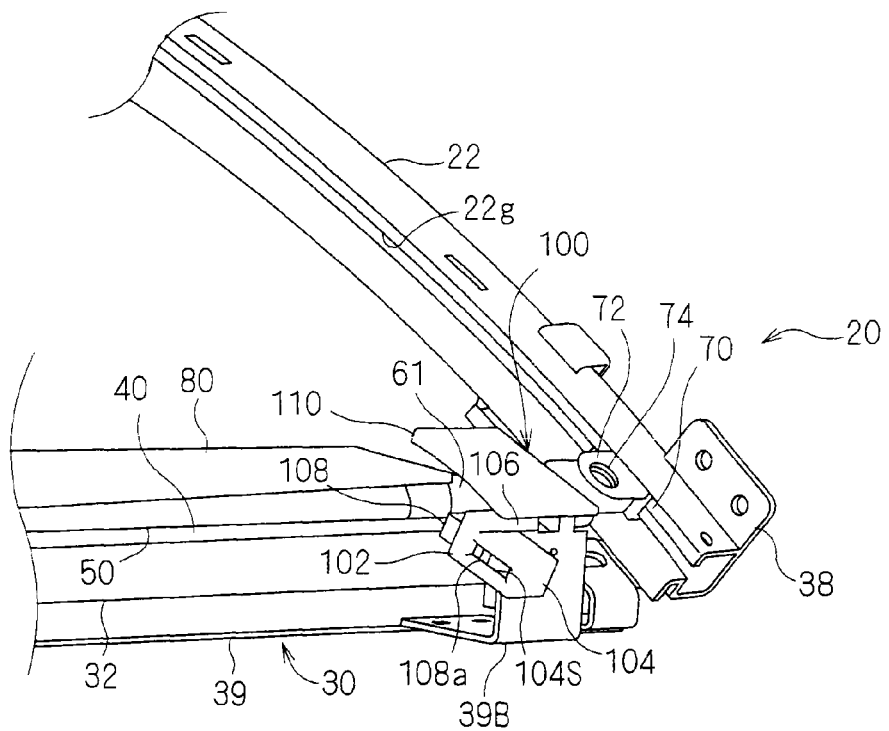
FIG. 15 is another perspective view showing the side cover portion.
Figure 16:
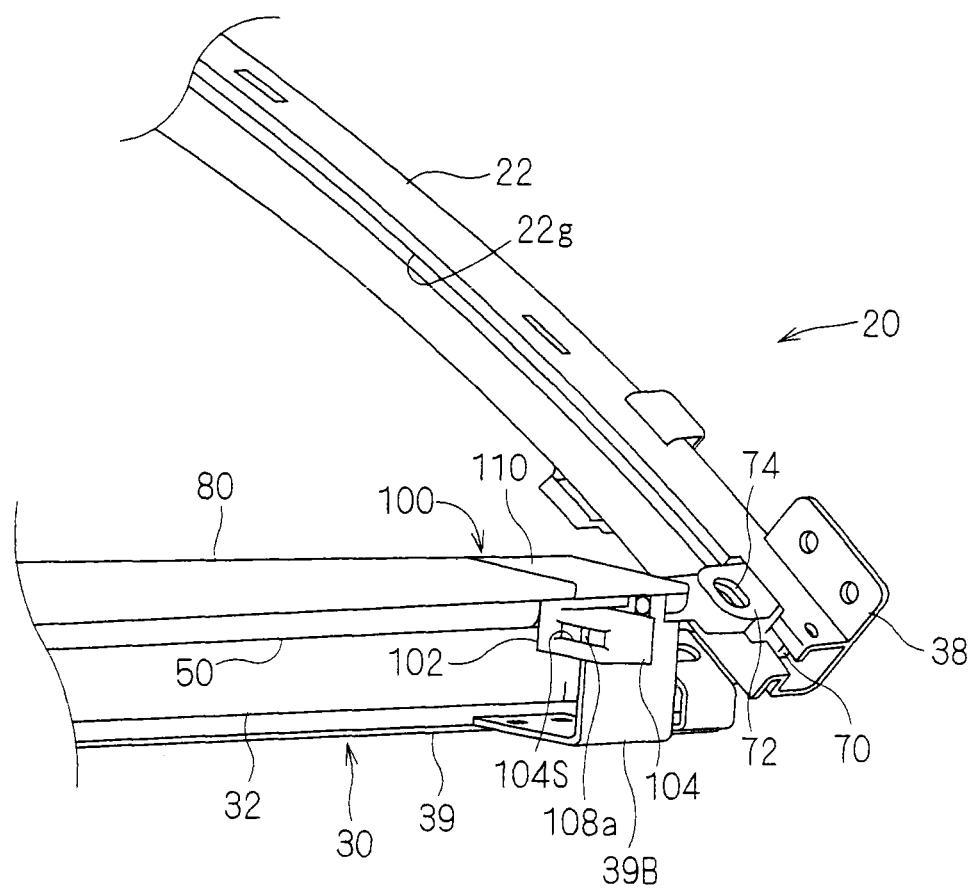
FIG. 16 is still another perspective view showing the side cover portion.

FIGS. 14 to 16 are perspective views showing the side cover 100 portion, where FIG. 14 shows the state in which the side cover 100 is opened, FIG. 15 shows the state in which the side cover 100 is being closed, and FIG. 16 shows the state in which the side cover 100 is closed. FIGS. 17 to 20 are explanatory views showing the operation of closing the side cover 100 as the shade 40 is wound and housed.

The pair of side covers 100 are fixed to both ends of the frame member 39 via brackets 39B in the vicinity of the both ends of the windup device 30. Each side cover 100 includes a side cover main body 102, a reception part 108, and a cover part 110.

The side cover main body 102 is a member formed of a resin or the like and includes a reception part supporting part 104 and a rocking support part 106 extending toward one side of the reception part supporting part 104. The rocking support part 106 is rotatably supported about an axis parallel to the axis of the windup shaft 32 by the bracket 39B at the location on the side of one end of the windup device 30. The reception part supporting part 104 is formed into a barrel shape with an opening on one end side, and the reception part 108 is inserted therethrough from the opening to protrude therefrom and retract thereinto. The reception part supporting part 104 of the side cover main body 102 is provided at the location closer to the center of the windup device 30 compared with the cover part 110 described below, and is set such that the opening on one end side of the side cover main body 102 and the reception part 108 protruding from the opening are located on the moving track of the stay 50 that has moved toward the inner side of the slit 12S. Formed in the other side portion of the reception part supporting part 104 is a slit 104S.

The cover part 110 is formed into a plate shape capable of covering the end portion of the slit 12S that is not covered by the cover body 80. That is, in a case where the shade 40 has a trapezoidal shape (particularly, isosceles trapezoidal shape), the length dimension of the slit 12S is set correspondingly to the length dimension of the long side edge 40b of the shade 40 such that almost the whole of the shade 40 is drawn. Meanwhile, the length dimensions of the stay 50 and the cover body 80 provided at the distal end of the shade 40 are set correspondingly to the length dimension of the short side edge 40a of the shade 40. For this reason, the length dimension of the cover body 80 is smaller than the length dimension of the slit 12S, and even if the slit 12S is covered with the cover body 80, both ends of the slit 12S remain open. Accordingly, the openings at both ends of the slit 12S are covered by the cover parts 110 separately provided from the cover body 80. The cover part 110 is integrated with the side cover main body 102 and is configured to rock together with the side cover main body 102. Then, the cover part 110 and the side cover main body 102 are allowed to change positions thereof between the covering position (here, approximately parallel position) in which the cover part 110 covers the end of the slit 12S and the open position (here, position in which the cover part 110 is lifted upwardly from the slit 12S to be inclined) in which the cover part 110 makes the end of the slit 12S open. The cover part 110 and the side cover main body 102 may be integrally formed of a resin or the like by molding or may be separately formed to be attached to each other by, for example, screwing or locking structure.

The side cover main body 102 and the cover part 110 are biased toward the open position by a biasing part 111 such as a torsion coil spring mounted to the support shaft part of the side cover main body 102 (see FIG. 17).

The reception part 108 is formed as a long member, here, formed into a square bar shape, and is inserted into the reception part supporting part 104 from the opening on one end side so as to protrude therefrom and retract thereinto. Further, a lug 108a is formed on the side of the reception part 108, and the lug 108a moves within the slit 104S in the state in which the reception part 108 is inserted. The lug 108a is regulated to move within the slit 104S, so that the reception part 108 is prevented from coming out of the reception part supporting part 104. In the state in which the reception part 108 is inserted into the reception part supporting part 104, a reception part biasing part 109 such as a coil spring is provided between the deep portion of the reception part supporting part 104 and the proximal end of the reception part 108 in a compressed state. The reception part biasing part 109 biases the reception part 108 toward the direction toward which the reception part 108 protrudes. Then, the stay 50 moves toward the inner side of the slit 12S, whereby the stay 50 abuts against the reception part 108 to push the reception part 108.

The operation of the side cover 100 is described.

First, in the state in which the shade 40 is drawn, the side cover main body 102 and the cover part 110 are made open (see FIGS. 14 and 17). In the state in which the cover part 110 is opened, the whole of the slit 12S in the longitudinal direction is opened, whereby the shade 40 including the long side edge 40b of the shade 40 can be drawn/housed without any problem (see FIG. 15).

The shade 40 is wound and housed from the above-mentioned state, and the stay 50 enters the slit 12S, whereby the end of the stay 50 abuts against the distal end of the reception part 108 and pushes the reception part 108 (see FIG. 18). Then, the side cover main body 102 and the cover part 110 change the positions thereof toward the covering position against the biasing force of the biasing part 111 while the reception part 108 is compressing the reception part biasing part 109 as well as is being pushed toward the side cover main body 102 (see FIG. 19).

In the state in which the shade 40 is housed entirely, the stay 50 pushes the side cover main body 102 via the reception part 108, and the side cover main body 102 and the cover part 110 change the positions thereof to the covering positions (see FIGS. 16 and 20). On this occasion, the reception part 108 pushes the side cover main body 102 while deforming the reception part biasing part 109 in a compressed manner, whereby the cover part 110 can be pushed more entirely to enter the covering position while absorbing a positional error of the stay 50 and the side cover main body 102 in the case where the shade 40 is housed entirely.

The side cover 100 is capable of more entirely covering the slit 12S through which the shade 40 is drawn.

In a case where the shade 40 is drawn, the force by which the stay 50 pushes the reception part 108 is released before and after the stay 50 comes out of the slit 12. This allows the side cover main body 102 and the cover part 110 to change the positions thereof to the open position by the biasing force of the biasing part 111 while the reception part 108 is caused to protrude due to the deformation that the reception part biasing part 109 extends. Therefore, at the stage at which the wide portion on the proximal end side of the shade 40 is drawn from the slit 12, the slit 12 is made open entirely in the width direction, and the shade 40 is drawn without interfering with the side cover 100.

While the embodiment has described the example in which the pair of side covers 100 are provided, in the case where, for example, only one end side of a slit for drawing/housing the shade 40 is open, only one side cover 100 may be provided.

While the embodiment has described the example in which the stay 50 pushes a member on the side cover 100 side, the cover body 80 may push a member on the side cover 100 side.

In a case where the cover body 80 is omitted and the stay 50 covers the slit 12S, the cover part 110 may be configured to cover the slit 12S on the side of the stay 50.

Further, the configuration in which the side cover 100 is opened/closed as the shade 40 is housed/drawn is not limited to the above-mentioned example. It suffices that the side cover 100 makes the both ends of the slit 12S open when the shade 40 is drawn/housed and covers the both ends of the slit 12S in the state in which the shade 40 is housed. For example, the side cover 100 may be a side cover that is opened/closed upon reception of the movement of the runner 70 or the rotation of the windup shaft 32.

While the sunshade device has been described above in detail, the foregoing description is in all aspects illustrative, and the present invention is not limited thereto. That is, numerous modifications and variations can be devised in the described aspects without departing from the scope of the invention.

DESCRIPTION OF REFERENCE SYMBOLS 10 rear window
12 slit
12 mounting panel member
12S slit
14 frame member
16 ceiling portion
20 sunshade device
22 rail
30 windup device
32 windup shaft
40 shade
40a short side edge
40b long side edge
40 shade
50 stay
60 rotation mechanism
61 shaft
63 protrusion
64 guide member
65 guide hole
66 guide recess
66L linear groove portion
66S spiral groove portion
70 runner
80 cover body
100 cover

The invention claimed is:

1. A sunshade device configured to shield a window, comprising:
 a pair of rails disposed so as to have a gradually decreasing spacing therebetween at least at a part from a proximal end toward a distal end thereof;
 a windup device disposed between proximal ends of said pair of rails and including a windup shaft supported so as to rotate about an axis;
 a shade including a short side edge and a long side edge opposed to each other and configured to be drawn from and housed in said windup device, said long side edge being attached to said windup shaft;
 a stay attached to the short side edge of said shade;
 a pair of shafts respectively inserted into both ends of said stay so as to move along a longitudinal direction thereof and rotatably support the stay;
 a pair of runners respectively provided so as to move along said pair of rails and coupled to said pair of shafts; and
 a rotation mechanism including a protrusion and a guide recess for guiding the protrusion, one of which is provided on an inner peripheral portion of said stay and the other of which is provided on an outer peripheral portion of said shaft, and causing said stay to change a position thereof by rotating relative to said shaft, through sliding contact of said protrusion with said guide recess, upon reception of a force resulting from the movement of the shafts along the longitudinal direction of said stay due to a change of the spacing between said pair of rails as said pair of runners move along said pair of rails,
 wherein said stay is provided with a cover body covering gaps between the upper window located on a distal end side of said pair of rails and said stay in a state in which said shade is drawn.

2. The sunshade device according to claim 1, wherein said guide recess comprises a spiral groove portion.

3. The sunshade device according to claim 1, wherein
 a guide member in which said guide recesses are formed is inserted into said stay, and
 said guide member is configured by combination of a plurality of divided guide members in which recesses to form said guide recesses are formed in side end portions.

4. The sunshade device according to claim 1, wherein said pair of rails are configured to have the spacing therebetween that has a gradually decreasing dimension from the proximal end toward the distal end so as to be disposed along both sides of a trapezoidal window.

5. The sunshade device according to claim 1, wherein
 said shade is configured to be drawn and housed through a slit formed in a mounting panel member located near the window, and
 said rotation mechanism causes said stay to change the position thereof such that at least one of said stay and said cover body is disposed to be flush with the surface of said mounting panel member.

6. The sunshade device according to claim 1, wherein
 said shade is configured to be drawn and housed through a slit formed in a mounting panel member located near the window, and
 side covers that openably cover both ends of said slit in the state in which said shade is housed are provided in portions outside of both ends of at least one of said stay and said cover body.

* * * * *